United States Patent [19]

St. Clair

[11] Patent Number: 5,554,691

[45] Date of Patent: * Sep. 10, 1996

[54] ADHESIVES, SEALANTS, COATINGS AND POLYMER COMPOSITIONS CONTAINING MONOHYDROXYLATED POLYDIENES IN HYDROXYL FUNCTIONAL RESINS

[75] Inventor: David J. St. Clair, Houston, Tex.

[73] Assignee: Shell Oil Company, Houston, Tex.

[*] Notice: The term of this patent shall not extend beyond the expiration date of Pat. No. 5,378,761.

[21] Appl. No.: 298,701

[22] Filed: Aug. 31, 1994

Related U.S. Application Data

[63] Continuation of Ser. No. 90,857, Jul. 12, 1993, abandoned.

[51] Int. Cl.$^6$ .................................................. C08L 33/14
[52] U.S. Cl. ................ 525/111; 528/49; 528/69; 528/75; 525/125; 525/127; 525/528; 525/452
[58] Field of Search .................................. 525/125, 127, 525/111, 528, 452; 528/49, 69, 75

[56] References Cited

U.S. PATENT DOCUMENTS

| Re. 27,145 | 1/1964 | Jones | 525/111 |
|---|---|---|---|
| 3,674,743 | 7/1972 | Verdol et al. | 528/63 |
| 4,039,593 | 8/1977 | Kamienski et al. | 563/851 |
| 4,165,344 | 8/1979 | Okuda et al. | 525/111 |
| 4,242,468 | 12/1980 | Baack et al. | 521/170 |
| 4,469,829 | 9/1984 | Konietzny et al. | 524/103 |
| 4,508,879 | 4/1985 | Holubka | 525/528 |
| 4,639,080 | 1/1987 | Kimura et al. | 385/141 |
| 5,166,277 | 11/1992 | Goodwin et al. | 525/338 |
| 5,378,761 | 1/1995 | St. Clair | 525/511 |

*Primary Examiner*—Paul J. Thibodeau
*Assistant Examiner*—Mary Critharis
*Attorney, Agent, or Firm*—Keith M. Tackett

[57] ABSTRACT

Adhesives, sealants, coatings and polymer blends made with conjugated diene polymers having about one terminal hydroxyl group per molecule reacted with conventional epoxy or acrylic resins.

10 Claims, No Drawings

ADHESIVES, SEALANTS, COATINGS AND POLYMER COMPOSITIONS CONTAINING MONOHYDROXYLATED POLYDIENES IN HYDROXYL FUNCTIONAL RESINS

This is a continuation of application Ser. No. 08/090,857, filed Jul. 12, 1993, now abandoned.

FIELD OF THE INVENTION

This invention relates to adhesives, sealants and coatings containing alkyd, polyester, acrylic or epoxy resins having hydroxyl groups reacted with isocyanate or amine curing agents.

BACKGROUND OF THE INVENTION

The reaction of diisocyanates, polyisocyanates or amine curing agents with alkyd resins, polyester resins, epoxy resins or acrylic resins having hydroxyl groups is used to make coatings for metals and plastics. In conventional coatings, high molecular weight components could be used in solvent solution that make coatings having a broad range of properties. However, solventless or low solvent coatings, which have been developed in response to environmental problems with solvents, must be formed from low molecular weight components which typically make hard coatings that have poor flexibility and poor adhesion to plastics.

Monohydroxlated polybutadienes are known in the art for use in adhesive formulations. U.S. Pat. No. 4,242,468 describes solventless polyurethane coatings having improved flexibility resulting from incorporation of monohydroxylated polybutadienes.

It is an object of the present invention to provide adhesives, sealants and coatings based on resins which contain hydroxyl groups having good flexibility and adhesion to plastics from low molecular weight components.

SUMMARY OF THE INVENTION

The present invention includes improved adhesives, sealants and coatings, in particular improved epoxy or acrylic adhesives, sealants and coatings, formed from low molecular weight components and having good flexibility resulting by incorporation of low molecular weight monohydroxlated polybutadienes into the isocyanate curing agent prior to addition to the hydroxy containing resin or by incorporation of low molecular weight monohydroxylated polybutadienes onto the hydroxyl groups on the resin by reaction with a diisocyanate. The polybutadienes toughen the adhesives, sealants and coatings which improves their impact strength. These products also exhibit improved low temperature properties. The polybutadienes are an integral part of the product and do not migrate to the surface. The invention also encompasses polymer compositions made with these modified monohydroxylated polybutadienes.

DETAILED DESCRIPTION OF THE INVENTION

The monohydroxylated polybutadienes are synthesized by anionic polymerization of conjugated diene hydrocarbons with lithium initiators. This process is well known as described in U.S. Pat. Nos. 4,039,593 and Re. 27,145 which descriptions are incorporated herein by reference. Polymerization commences with a monolithium, dilithium, or polylithium initiator which builds a living polymer backbone at each lithium site. Typical monolithium living polymer structures containing conjugated diene hydrocarbons are:

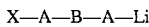

wherein B represents polymerized units of one or more conjugated diene hydrocarbons such as butadiene or isoprene, A represents polymerized units of one or more vinyl aromatic compounds such as styrene, and X is the residue of a monolithium initiator such as sec-butyllithium. B can also be a copolymer of a conjugated diene and a vinyl aromatic compound.

When the conjugated diene is 1,3-butadiene and when the conjugated diene polymer will be hydrogenated, the anionic polymerization of the conjugated diene hydrocarbons is typically controlled with structure modifiers such as diethylether or glyme (1,2-diethoxyethane) to obtain the desired amount of 1,4addition. As described in U.S. Pat. No. Re 27,145 which is incorporated by reference herein, the level of 1,2-addition of a butadiene polymer or copolymer can greatly affect elastomeric properties after hydrogenation. The hydrogenated polymers exhibit improved heat stability and weatherability in the final, adhesive, sealant or coating.

The 1,2-addition of 1,3-butadiene polymers having terminal functional groups influences the viscosity of the polymers as described in more detail below. A 1,2-addition of about 40% is achieved during polymerization at 50° C. with about 6% by volume of diethylether or about 1000 ppm of glyme.

Anionic polymerization is often terminated by addition of water to remove the lithium as lithium hydroxide (LiOH) or by addition of an alcohol (ROH) to remove the lithium as a lithium alkoxide (LiOR). For polymers having terminal functional groups, the living polymer chains are preferably terminated with hydroxyl, carboxyl, phenol, epoxy, or amine groups by reaction with ethylene oxide, carbon dioxide, a protected hydroxystyrene monomer, ethylene oxide plus epichlorohydrin, or the amine compounds listed in U.S. Pat. No. 4,791,174, respectively.

The termination step can result in release of fine particles of lithium bases as described in U.S. Pat. No. 5,166,277 which is incorporated by reference herein. The lithium bases may interfere with hydrogenation of the polymer and preferably are removed.

Termination with carbon dioxide results in carboxylate salt groups that reduce hydrogenation catalyst activity as described in U.S. Pat. No. 4,970,254 which disclosure is incorporated by reference herein. Improved hydrogenation is obtained by converting the carboxylate salt groups to ester groups prior to hydrogenation and then reconverting to carboxylate salt or carboxylic acid groups after hydrogenation.

Hydrogenation of at least 90%, preferably at least 95%, of the unsaturation in low molecular weight butadiene polymers is achieved with nickel catalysts as described in U.S. Pat. No. Re. 27,145 and U.S. Pat. No. 4,970,254 and U.S. patent application Ser. No. 07/785715 which are incorporated by reference herein. The preferred nickel catalyst is a mixture of nickel 2-ethylhexanoate and triethylaluminum described in more detail in Example 1 below.

Butadiene polymers having only one terminal functional group selected from hydroxyl, carboxyl, phenol, epoxy, and amine groups can be used without solvents when the viscosity of the polymer is less than about 500 poise at mixing and application temperature. Since these polymers are mono-functional, they cannot form network structures via atomic attractions that would otherwise solidify multifunctional polymers. Hydrogenated butadiene polymers having a lower viscosity than 500 poise at mixing and application temperatures are produced by limiting the peak molecular weight to a range from about 500 to 20,000 and by limiting the 1,2-addition of hydrogenated butadiene to an amount between 30% and 70%, preferably between 40% to 60%.

The polybutadiene polymers used in the invention have the conventional utilities such as forming polyurethane coatings as described in U.S. Pat. No. 4,242,468. However, the present invention comprises use of the monohydroxylated polybutadiene polymers as plasticizers in epoxy or acrylic resins that contain hydroxyl groups.

The monohydroxylated polymers are first reacted with all or some of the isocyanate functional curing agent which is conventionally used to cure the epoxy or acrylic resin in an amount sufficient to give the desired improvement in toughness in the cured coating. Alternatively, the monohydroxylated polymers can be capped with a diisocyanate and then added to the hydroxyl functional epoxy or acrylic resin. The modified curing agent is then blended with the epoxy or acrylic resin or the modified resin is blended with unmodified curing agent, applied to a metal or plastic substrate, and allowed to cure to form a flexible coating.

DETAILED DESCRIPTION OF PREFERRED EMBODIMENTS

The monohydroxylated 1,3-butadiene polymers used in the preferred coatings have a peak molecular weight from 500 to 20,000. The monohydroxylated polymers can be unsaturated with 1,2-addition from 5% to 95% or hydrogenated with 1,2-addition from 30% to 70%. The polymers preferably have from 0.8 to 1.1 hydroxyl groups per molecule.

The epoxy resin coatings of the invention are preferably the glycidyl ether type such as the EPON® Resins available from Shell, most preferably EPON® 1001 resin (500 epoxide equivalent weight, 500 hydroxyl equivalent weight) or EPON® 1007 resin (2000 epoxide equivalent weight, 200 hydroxyl equivalent weight). The EPON® resins are preferably cured with trifunctional isocyanates such as MONDUR® CB-60 (a reaction product of toluene diisocyanate and trimethyolpropane) or DESMODUR® Z-4370 from Miles (an isocyanurate of isophorone diisocyanate), a low molecular weight polyamide such as Curing Agent V-15 from Shell (a 240 amine equivalent polyamide resin), or melamine resins such as the combination of CYMEL® 303 (melamine resin) and CYCAT® 600 (acid catalyst) from Americam Cyanamid.

The epoxy resins which have hydroxyl (OH) groups are plasticized with the saturated or unsaturated monohydroxylated polybutadiene by reacting the hydroxyl (OH) group on the polybutadienes with a portion of the isocyanate (NCO) or amine groups on the curing agents as described in the examples below. Alternatively, the monohydroxylated polybutadienes can be capped with a diisocyanate such as MONDUR® M from Miles (diphenyl methane diisocyanate) or isophorone diisocyanate (IPDI) from Huls and reacted onto the hydroxyl groups of the epoxy or acrylic resin.

The acrylic resin coatings of the invention are preferably formed from hydroxyl functional acrylic resins such as JONCRYL® 510 acrylic resin (400 hydroxyl equivalent weight) available from S. C. Johnson. The acrylic resins are preferably cured by the same isocyanate and melamine curing agents described for the epoxy resins.

The amounts of curing agents used to form the coatings of the invention are readily determined from the various hydroxyl (OH), isocyanate (NCO), and amine contents of the various components. In addition to the information provided above, MONDUR® M has a NCO equivalent weight of 127, IPDI has a NCO equivalent weight of 111, MONDUR® CB-60 has a NCO equivalent weight of 404, DESMODUR® Z-4370 has a NCO equivalent weight of 365, CYMEL® 303 has a $CH_3O$ (methyl ether) equivalent weight of 150.

Isocyanate curing agents are typically cured at ambient temperature and are often enhanced by addition of DABCO® T-12 catalyst which is a dibutyl tin dilaurate from Air Products. Bake-cured coatings can be cured with melamine resins or with isocyanate resins in which the NCO groups have been blocked by reaction with a blocking agent which will volatilize during baking.

The materials of the present invention are useful in adhesives (including pressure sensitive adhesives, contact adhesives, laminating adhesives and assembly adhesives), sealants (such as urethane architectural sealants, etc.), coatings (such as topcoats for automotive, epoxy primers for metal, polyester coil coatings, alkyd maintenance coatings, etc.), films (such as those requiring heat and solvent resistance), molded and extruded thermoplastic and thermoset parts (for example thermoplastic injection molded polyurethane rollers or reaction injection molded thermoset auto bumper, facie, etc.). However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the polymers of the present invention and the curing agent. However, in most adhesive, coating and sealant applications, suitable formulations would also contain various combinations of resins, plasticizers, fillers, solvents, stabilizers and other ingredients such as asphalt. The following are some typical examples of formulations for adhesives, coatings and sealants.

In adhesive applications, as well as in coatings and sealants, it may be necessary to add an adhesion promoting or tackifying resin that is compatible with the polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymer used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez®resin made by Hercules. The amount of adhesion promoting resin employed varies from 0 to 400 parts by weight per hundred parts rubber (phr), preferably between 20 to 350 phr, most preferably 20 to 150 phr. The selection of the particular tackifying agent is, in large part, dependent upon the specific polymer employed in the respective composition.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. The amounts of rubber compounding oil employed in the invention composition can vary from 0 to about 500 phr, preferably between about 0 to about 100 phr, and most preferably between about 0 and about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the composition.

Various types of fillers and pigments can be included in the coating or sealant formulation. This is especially true for exterior coatings or sealants in which fillers are added not only to create the desired appeal but also to improve the performance of the coatings or sealant such as its weatherability. A wide variety of fillers can be used. Suitable fillers include calcium carbonate, clays, talcs, silica, zinc oxide, titanium dioxide and the like. The amount of filler usually is in the range of 0 to about 65%w based on the solvent free portion of the formulation depending on the type of filler used and the application for which the coating or sealant is intended. An especially preferred filler is titanium dioxide.

If the coating or sealant will be applied from solvent solution, the organic portion of the formulation will be dissolved in a solvent or blend of solvents. Aromatic hydrocarbon solvents such as toluene, xylene, or Shell Cyclo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50%w in the solvent blend.

Combinations of primary and secondary antioxidants are preferred. Such combinations include sterically hindered phenolics with phosphites or thioethers, such as hydroxyphenylpropionates with aryl phosphates or thioethers, or amino phenols with aryl phosphates. Specific examples of useful antioxidant combinations include 3-(3,5-di-t-butyl-4-hydroxyphenyl)propionate)methane (Irganox® 1010 from Ciba-Geigy) with tris(nonylphenyl)phosphite (Polygard® HR from Uniroyal), Irganox® 1010 with bis(2,4-di-t-butyl-)pentaerythritol diphosphite (Ultranox® 626 from Borg-Warner).

Additional stabilizers known in the art may also be incorporated into the composition. These may be for protection during the life of the article against, for example, oxygen, ozone and ultra-violet radiation. However, these additional stabilizers should be compatible with the essential stabilizers mentioned hereinabove and their intended function as taught herein.

All adhesive, coating and sealant compositions based on the polymers of this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive, coating or sealant application.

Adhesives are frequently thin layers of sticky compositions which are used in protected environments (adhering two substrates together). Therefore, the polymers will usually have adequate stability so resin type and concentration will be selected for maximum stickiness without great concern for stability, and pigments will usually not be used.

Coatings are frequently thin, non-sticky, pigmented compositions applied on a substrate to protect or decorate it. Therefore, hydrogenated epoxidized polymers may be needed to give adequate durability. Resins will be selected to assure maximum durability and minimum dirt pick-up. Fillers and pigment will be selected carefully to give appropriate durability and color. Coatings will frequently contain relatively high solvent concentration to allow easy application and give a smooth dry coating.

Sealants are gap fillers. Therefore, they are used in fairly thick layers to fill the space between two substrates. Since the two substrates frequently move relative to each other, sealants are usually low modulus compositions capable of withstanding this movement. Since sealants are frequently exposed to the weather, the hydrogenated epoxidized polymers are usually used. Resins and plasticizers will be selected to maintain low modulus and minimize dirt pick-up. Fillers and pigment will be selected to give appropriate durability and color. Since sealants are applied in fairly thick layers, solvent content is as low as possible to minimize shrinkage.

A formulator skilled in the art will see tremendous versatility in the polymers of this invention to prepare adhesives, coatings and sealants having properties suitable for many different applications.

The adhesive, coating and sealant compositions of the present invention can be prepared by blending the components at an elevated temperature, preferably between about 50° C. and about 200° C., until a homogeneous blend is obtained, usually less than three (3) hours. Various methods of blending are known to the art and any method that produces a homogenous blend is satisfactory. The resultant compositions may then be used in a wide variety of applications. Alternatively, the ingredients may be blended into a solvent.

The adhesive compositions of the present invention may be utilized as many different kinds of adhesives, for example, laminating adhesives, pressure sensitive adhesives, tie layers, hot melt adhesives, solvent borne adhesives and waterborne adhesives in which the water has been removed before curing. The adhesive can consist of simply the polymer or, more commonly, a formulated composition containing a significant portion of the polymer along with other known adhesive composition components.

The modified monohydroxylated conjugated diene polymers of the present invention may also be blended with other polymers to improve their impact strength and/or flexibility. Such polymers are generally condensation polymers including polyamides, polyurethanes, vinyl alcohol polymers, vinyl ester polymers, polysulfones, polycarbonates and polyesters, including those, like polylactones, which have a recurring ester linkage in the molecule, and those, like polyalkylene arylates, including polyalkylene terephthalates, having a structure formed by polycondensation of a dicarboxylic acid with a glycol. The blends may be made in the reactor or in a post compounding step.

The present invention is further described by the following examples which include the best mode known to Applicant for making a flexible coating that is plasticized with a monohydroxylated polybutadiene. The examples are not intended to limit the present invention to specific embodiments although each example may support a separate claim which Applicant asserts to be a patentable invention.

The peak molecular weights were measured using gel permeation chromatography (GPC) calibrated with polybutadiene standards having known peak molecular weights. The solvent for the GPC analyses was tetrahydrofuran.

The 1,2-additions of polybutadiene were measured by $C^{13}$ NMR in chloroform solution.

EXAMPLE 1

(Hypothetical).

A linear butadiene polymer having about one terminal hydroxyl group per molecule, a peak molecular weight of 4000, and a 1,2-addition of 7%, is prepared as described below. The linear butadiene precursor polymer is synthesized using secbutyl lithium to initiate the polymerization of 1,3-butadiene. The living polymer chain ends are capped using ethylene oxide and terminated with methanol to afford a polybutadiene polymer having a terminal, primary hydroxyl functional group. This polymer is a moderate viscosity (about 25 poise) liquid at 25° C.

Into a reactor purged of air and moisture is charged 72 moles of purified 1,3-butadiene at 10% w in purified cyclohexane and 1 mole of sec-butyl lithium at 25° C. The polymerization exotherm gradually raises the reactor temperature to 60° C. over about a one hour period. Five moles of ethylene oxide are added and allowed to react for three hours to cap the butadiene polymers. The molecules are then terminated by addition of 5 moles of methanol. The polymer solution is stabilized by addition of 0.05% w Irganox 1076 and the polymer is removed from solution by solvent evaporation.

The monohydroxyl groups on the monohydroxylated butadiene polymer are converted to isocyanate termination by reaction of each mole of the polymer with 1.5 moles (50% excess) of diphenyl methane diisocyanate (MDI). Thus, the reactor was charged with 85.9% w of the monohydroxyl terminated polybutadiene, 4.1% w of the MDI, and 10% w of xylene. The reaction is completed in four hours under nitrogen blanket at 80° C. The isocyanate capped polymer has a NCO equivalent weight of 2100.

The isocyanate capped polybutadiene is reacted onto a few of the hydroxyl groups of EPON® 1001 epoxy resin at a 10/1 OH/NCO ratio. The modified epoxy resin is then cured with Shell Curing Agent V-15 at a 1/1 ratio of amine to epoxide, (2) MONDUR® CB-60 isocyanate curing agent at 1.1/1 ratio of NCO/OH, or (3) CYMEL® 303 at a 1/1 ratio of $CH_3O/OH$ which is catalyzed with CYCAT® 600. The compositions are as follows:

| Component, % w | 1A | 1B | 1C |
| --- | --- | --- | --- |
| EPON® 1001 epoxy | 44.8 | 39.0 | 51.6 |
| Capped polybutadiene | 18.8 | 16.4 | 15.5 |
| Curing Agent V-15 | 21.5 | 0 | 0 |
| MONDUR® CB-60 | 0 | 31.5 | 0 |
| CYMEL® 303 | 0 | 0 | 15.5 |
| CYCAT® 600 | 0 | 0 | 0.15 |
| Xylene | 7.5 | 6.5 | 8.6 |
| Methylisobutyl ketone | 7.5 | 6.5 | 8.6 |

Composition 1A is reacted for 4 hours at 80° C. under nitrogen prior to addition of the Curing Agent V-15 which is mixed in after cooling to room temperature. The final mixture is applied to steel panels and cured for one week at 25° C. to give a flexible corrosion protective coating.

Composition 1B is reacted for 4 hours at 80° C. under nitrogen prior to addition of the MONDUR® CB-60 which is mixed in after cooling to room temperature. The final mixture is applied to steel panels and cured for one week at 25° C. to give a flexible corrosion protective coating.

Composition 1C is reacted for 4 hours at 80° C. under nitrogen prior to addition of the CYMEL® 303 and CYCAT® 600 which are mixed in after cooling to room temperature. The final mixture is applied to steel panels and baked for 20 minutes at 150° C. to give a flexible corrosion protective coating.

The isocyanate capped polybutadiene is further reacted onto a few of the hydroxyl groups of EPON® 1007 epoxy resin available from Shell at a 15/1OH/NCO ratio. The modified epoxy resin is then cured with (1) MONDUR® CB-60 at 1/1 ratio of NCO/OH or (2) CYMEL® 303 at a 1/2 ratio of $CH_3O/OH$ which is catalyzed with CYCAT® 600. The compositions are as follows:

| Component, % w | 1D | 1E |
| --- | --- | --- |
| EPON® 1007 | 21.2 | 38.1 |
| Capped polybutadiene | 14.8 | 11.4 |
| MONDUR® CB-60 | 42.8 | 0 |
| CYMEL® 303 | 0 | 12.2 |
| CYCAT® 600 | 0 | 0.12 |
| Xylene | 10.6 | 19.1 |
| Methylisobutyl ketone | 10.6 | 19.1 |

Composition 1D is reacted for 4 hours at 80° C. under nitrogen prior to addition of the MONDUR® CB-60 isocyanate curing agent which is mixed in after cooling to room temperature. The final mixture is applied to steel panels and cured for one week at 25° C. to give a flexible corrosion protective coating.

Composition 1E is reacted for 4 hours at 80° C. under nitrogen prior to addition of the CYMEL® 303 curing agent and CYCAT® 600 catalyst which are mixed in after cooling to room temperature. The final mixture is applied to steel panels and baked for 20 minutes at 150° C. to give a flexible corrosion protective coating.

The isocyanate capped polybutadiene is further reacted onto a few of the hydroxyl groups of JONCRYL® 510 acrylic polymer at a 10/1OH/NCO ratio. The modified acrylic polymer is then cured with DESMODUR® Z-4370 isocyanate curing agent at about 1.1/1 ratio of NCO/OH which is catalyzed by DABCO® T-12. The composition is as follows:

| Component, % w | 1F |
|---|---|
| JONCRYL ® 510 | 46.4 |
| Capped polybutadiene | 19.5 |
| DESMODUR ® Z-4370 | 33.9 |
| DABCO ® T-12 | 0.2 |

Composition 1F is reacted for 4 hours at 80° C. under nitrogen prior to addition of the DESMODUR® Z-4370 isocyanate curing agent and DABCO® T-12 catalyst which are mixed in after cooling to room temperature. The final mixture is applied to steel panels and cured for one week at 25° C. to give a flexible corrosion protective coating.

EXAMPLE 2

(Hypothetical)

The linear butadiene polymer having about one terminal hydroxyl group per molecule from Example 1 is combined with MONDUR® CB-60 isocyanate curing agent by reaction at 30/1 ratio NCO/OH to give a rubber modified isocyanate curing agent. The reactor is charged with 22.3% w of the monohydroxyl terminated polybutadiene, 67.7% w of the MONDUR® CB-60 isocyanate curing agent, and 10% w of xylene after the butadiene polymer and the xylene are carefully dried to remove water. The reaction is completed in four hours under nitrogen at 80° C. This modified isocyanate curing agent has a NCO equivalent weight of 618.

The modified isocyanate curing agent is used to cure (1) EPON® 1001 epoxy resin at a 1/1.1OH/NCO ratio or (2) EPON® 1007 epoxy resin at a 1/1OH/NCO ratio. The compositions are as follows:

| Component, % w | 2A | 2B |
|---|---|---|
| EPON ® 1001 epoxy | 37.1 | 0 |
| EPON ® 1007 epoxy | 0 | 18.9 |
| Modified curing agent | 50.5 | 62.2 |
| Xylene | 6.2 | 9.4 |
| Methylisobutyl ketone | 6.2 | 9.4 |

Compositions 2A and 2B are prepared by adding the modified curing agent to the solution of the other components at room temperature. The final mixtures are applied to steel panels and cured for one week at 25° C. to give flexible corrosion protective coatings.

EXAMPLE 3

(Hypothetical)

A hydrogenated linear butadiene polymer having about one terminal hydroxyl group per molecule, a peak molecular weight of 3300, a 1,2-addition of butadiene of 45%, and a residual unsaturation of 0.3 meq/g (98.2% hydrogenated) is prepared as described below. The linear butadiene precursor polymer is synthesized using sec-butyl lithium to initiate the polymerization of 1,3-butadiene. The living polymer chain ends are capped using ethylene oxide and terminated with methanol to afford the precursor polymer having terminal, primary hydroxyl functionality. The polymer is hydrogenated with a Nickel/Aluminum catalyst and is a thick viscous liquid (about 200 poise) at 25° C.

Into a reactor purged of air and moisture is charged 57 moles of purified 1,3-butadiene at 10% w in a purified blend of cyclohexane (90% w) and diethyl ether (10% w). One mole of sec-butyl lithium is added at 25° C. The polymerization exotherm gradually raises the reactor temperature to 50° C. over about a one hour period. Five moles of ethylene oxide are added and allowed to react for three hours to cap the butadiene polymers. The molecules are then terminated by addition of 5 moles of methanol.

The butadiene polymer having terminal hydroxyl groups is transferred to a high pressure reactor for hydrogenation using a Nickel/Aluminum catalyst. The catalyst is prepared in advance by reacting nickel 2-ethylhexanoate with triethylaluminum in cyclohexane in amounts sufficient to give a ratio of 2.6 moles of aluminum to 1 mole of nickel. The polymer solution is sparged with hydrogen at 65° C. The reactor is then filled with hydrogen to a pressure of 810 psig. An initial aliquot of the Ni/Al catalyst solution is then pressured into the reactor in such a volume as to afford a Ni concentration of 100 ppm in the reaction mixture. An exothermic hydrogenation reaction ensues.

When the temperature of the reaction solution has stabilized, an aliquot of the solution is analyzed by ozonolysis to check the degree of hydrogenation of the monohydroxylated polybutadiene. If hydrogenation is incomplete, another aliquot of catalyst is added which leads to an additional exotherm. This process is repeated until the ozonolysis test showed essentially complete hydrogenation of the monohydroxylated polybutadiene polymer. An aliquot of the polymer solution is then analyzed by C(13)NMR to establish that 98% of the carbon-carbon unsaturation (—C=C—) had been hydrogenated.

The hydrogenation catalyst is removed from the polymer cement by contacting with an excess of 1% by weight aqueous sulfuric acid solution (organic/aqueous=1/3 vol/vol). The organic phase is washed repeatedly with water to remove excess sulfuric acid. Ammonia gas is bubbled through the organic phase to ensure complete neutralization. The polymer solution is stabilized by addition of 0.05% w Irganox 1076 and the polymer is removed from solution by solvent evaporation.

The monohydroxyl groups on the hydrogenated monohydroxylated butadiene polymer are converted to isocyanate termination by reaction of each mole of the polymer with 1.5 moles (50% excess) of isophorone diisocyanate (IPDI) which is catalyzed with DABCO® T-12. The reactor is charged with 66.6% w of the hydrogenated monohydroxyl terminated polybutadiene, 3.4% w of the IPDI, 0.02% w of the DABCO® T-12, and 30% w of xylene after the butadiene polymer and the xylene are carefully dried to remove water. The reaction is completed in four hours under nitrogen at 80° C. The isocyanate capped polymer solution has a NCO equivalent weight of 2500.

The isocyanate capped polybutadiene is reacted onto a few of the hydroxyl groups of EPON® 1001 epoxy resin at a 10/1 OH/NCO ratio. The modified epoxy resin is then cured with MONDUR® CB-60 isocyanate curing agent at 1.1/1 ratio of NCO/OH which is catalyzed with DABCO® T-12. The composition is as follows:

| Component, % w | 3A |
|---|---|
| EPON ® 1001 epoxy | 37.9 |
| Capped polybutadiene solution | 18.9 |
| DABCO ® T-12 | 0.10 |
| MONDUR ® CB-60 | 30.6 |
| Xylene | 6.3 |
| Methylisobutyl ketone | 6.3 |

Composition 3A is reacted for 4 hours at 80° C. under nitrogen prior to addition of the MONDUR® CB-60 isocyanate curing agent which is mixed in after cooling to room temperature. The final mixture is applied to steel panels and cured for one week at 25° C. to give a flexible corrosion protective coating.

The isocyanate capped hydrogenated polybutadiene is further reacted onto a few of the hydroxyl groups of EPON® 1007 epoxy resin at a 15/1OH/NCO ratio. The modified epoxy resin is then cured with MONDUR® CB-60 isocyanate curing agent from Miles at 1/1 ratio of NCO/OH. The composition is as follows:

| Component, % w | 3B |
|---|---|
| EPON ® 1007 epoxy | 20.6 |
| Capped polybutadiene solution | 17.2 |
| MONDUR ® CB-60 | 41.6 |
| Xylene | 10.3 |
| Methylisobutyl ketone | 10.3 |

Composition 3B is reacted for 4 hours at 80° C. under nitrogen prior to addition of the MONDUR® CB-60 isocyanate curing agent which is mixed in after cooling to room temperature. The final mixture is applied to steel panels and cured for one week at 25° C. to give a flexible corrosion protective coating.

The isocyanate capped hydrogenated polybutadiene is further reacted onto a few of the hydroxyl groups of JONCRYL® 510 acrylic polymer at a 10/1 OH/NCO ratio. The modified acrylic polymer is then cured with (1) DESMODUR® Z-4370 isocyanate curing agent at about 1.1/1 ratio of NCO/OH which is catalyzed by DABCO® T-12 or (2) CYMEL® 303 at a 1/1 ratio of CH$_3$O/OH which is catalyzed with CYCAT® 600. The compositions are as follows:

| Component, % w | 3C | 3D |
|---|---|---|
| JONCRYL ® 510 acrylic | 44.8 | 60.2 |
| Capped polybutadiene solution | 22.4 | 21.5 |
| DESMODUR ® Z-4370 | 32.7 | 0 |
| DABCO ® T-12 | 0.2 | 0 |
| CYMEL ® 303 | 0 | 18.1 |
| CYCAT ® 600 | 0 | 0.2 |

Composition 3C is reacted for 4 hours at 80° C. under nitrogen prior to addition of the DESMODUR® Z-4370 isocyanate curing agent and DABCO® T-12 catalyst which are mixed in after cooling to room temperature. The final mixture is applied to steel panels and cured for one week at 25° C. to give a flexible corrosion protective coating.

Composition 3D is reacted for 4 hours at 80° C. under nitrogen prior to addition of the CYMEL® 303 curing agent and CYCAT® 600 catalyst which are mixed in after cooling to room temperature. The final mixture is applied to steel panels and baked for 20 minutes at 150° C. to give a flexible corrosion protective coating.

EXAMPLE 4

(Hypothetical)

The linear hydrogenated butadiene polymer having about one terminal hydroxyl group per molecule from Example 3 is combined with DESMODUR® Z-4370 isocyanate curing agent by reaction at 30/1 ratio NCO/OH with DABCO® T12 catalyst to give a rubber modified isocyanate curing agent. The reactor is charged with 18.5% w of the monohydroxyl terminated hydrogenated polybutadiene, 61.2% w of the DESMODUR® Z-4370 isocyanate curing agent, 0.3% w of the DABCO® T-12 catalyst, and 20% w of xylene after the butadiene polymer and the xylene are carefully dried to eliminate moisture. The reaction is completed in four hours under nitrogen at 80° C. This modified isocyanate curing agent has a NCO equivalent weight of 617.

The modified isocyanate curing agent is used to cure JONCRYL® 510 acrylic polymer at a 1/1.1 OH/NCO ratio which is catalyzed by DABCO® T-12. The composition is as follows:

| Component, % w | 4 |
|---|---|
| JONCRYL ® 510 acrylic | 42.3 |
| Modified curing agent | 57.4 |
| DABCO ® T-12 | 0.3 |

Composition 4 is prepared by mixing the components at ambient temperature. The final mixture is applied to steel panels and cured for one week at 25° C. to give a flexible corrosion protective coating.

I claim:

1. A coating, adhesive or sealant composition comprising a compound made by:

reacting a monohydroxylated conjugated diene polymer having a peak molecular weight from 500 to 20,000 with a diisocyanate or multifunctional isocyanate to form a modified curing agent;

reacting the modified curing agent with an epoxy resin or an acrylic resin having hydroxyl groups.

2. The composition of claim 1, wherein the monohydroxylated conjugated diene polymer is a hydrogenated monohydroxylated 1,3-butadiene polymer having from 30% to 70% 1,2-addition and a residual unsaturation less than 10%.

3. The composition of claim 2, wherein the 1,3-butadiene polymer is reacted with a trifunctional isocyanate curing agent.

4. The composition of claim 3, wherein the modified curing agent is reacted with an epoxy resin.

5. The composition of claim 4, wherein the reaction between the epoxy resin and the modified curing agent is catalyzed by addition of dibutyl tin dilaurate.

6. A coating, adhesive or sealant composition comprising with a compound made by:

reacting a monohydroxylated conjugated diene polymer having a peak molecular weight of from 500 to 20,000 with a diisocyanate to form an isocyanate functional polymer;

reacting the isocyanate functional polymer with an epoxy resin or an acrylic resin having hydroxyl groups to form a modified resin; and reacting the modified resin with a curing agent selected from the group consisting of isocyanates, melamines, and polyamines.

7. The composition of claim 6, wherein the monohydroxylated conjugated diene polymer is a hydrogenated monohydroxylated 1,3-butadiene polymer having from 30% to 70% 1,2-addition and a residual unsaturation less than 10%.

8. The composition of claim 7, wherein the 1,3-butadiene polymer is reacted with a diphenylmethane diisocyanate.

9. The composition of claim 8, wherein the isocyanate functional polymer is reacted with an epoxy resin.

10. The composition of claim 9, wherein the modified resin is reacted with an isocyanate curing agent.

* * * * *